United States Patent [19]

Fergason

[11] Patent Number: 4,540,243
[45] Date of Patent: * Sep. 10, 1985

[54] METHOD AND APPARATUS FOR CONVERTING PHASE-MODULATED LIGHT TO AMPLITUDE-MODULATED LIGHT AND COMMUNICATION METHOD AND APPARATUS EMPLOYING THE SAME

[76] Inventor: James L. Fergason, 5806 Horning Rd., Kent, Ohio 44240

[*] Notice: The portion of the term of this patent subsequent to May 31, 2000 has been disclaimed.

[21] Appl. No.: 409,526

[22] Filed: Aug. 19, 1982

Related U.S. Application Data

[63] Continuation-in-part of Ser. No. 235,006, Feb. 17, 1981, Pat. No. 4,436,376, which is a continuation-in-part of Ser. No. 121,071, Feb. 13, 1980, Pat. No. 4,385,806, which is a continuation-in-part of Ser. No. 913,618, Jun. 8, 1978, abandoned.

[51] Int. Cl.³ .................................................. G02F 1/13
[52] U.S. Cl. ...................................... 350/337; 350/332; 350/347 E; 455/605; 455/611; 455/616; 455/617
[58] Field of Search .................. 350/332, 334, 347 E, 350/337; 455/605, 611, 616, 617

[56] References Cited

U.S. PATENT DOCUMENTS

| | | | |
|---|---|---|---|
| 2,039,812 | 5/1936 | Leib et al. | 343/107 |
| 3,214,590 | 10/1965 | Schactman | 455/611 X |
| 3,277,396 | 10/1966 | Statz et al. | 455/611 X |
| 3,495,189 | 2/1970 | Le Craw | 455/611 X |
| 3,584,220 | 6/1971 | Nomura | 455/605 |
| 3,654,473 | 4/1972 | Nussmeier | 455/611 |
| 3,675,022 | 7/1972 | Nelson et al. | 455/611 |
| 3,694,053 | 9/1972 | Kahn | 350/347 E |
| 3,790,251 | 2/1974 | Wysocki et al. | 350/346 |
| 4,131,791 | 12/1978 | Lego, Jr. | 350/332 X |
| 4,436,376 | 3/1984 | Fergason | 350/332 |

FOREIGN PATENT DOCUMENTS 2626306 12/1977 Fed. Rep. of Germany ...... 455/605

OTHER PUBLICATIONS

Niblack, W. & Wolfe, E. "Polarization Modulation and Demodulation of Light," *Applied Optics*, vol. 3, No. 2 (Feb. 1964), pp. 277–279.

*Primary Examiner*—John K. Corbin
*Assistant Examiner*—Richard F. Gallivan
*Attorney, Agent, or Firm*—Thomas H. Murray

[57] ABSTRACT

A light modulator for generating a beam of amplitude-modulated light including a source of polarized light, at least one and preferably two liquid crystal cells having a thin layer of nematic liquid crystals of positive dielectric anisotropy through which the polarized light is directed to produce a beam of light having a phase shift corresponding to a modulating electrical signal which is applied to each of the liquid crystal cells. The liquid crystal cells in addition have a continuing electrical bias applied across the layers in order to achieve the rapid response times necessary to achieve phase modulation of the polarized light. The resulting phase-modulated light is converted in a linear polarizer to amplitude-modulated light corresponding to the modulating electrical signal. The amplitude-modulated light is detected in a suitable light detector which generates an electrical signal corresponding to the modulating electrical signal. The linear polarizer may be oriented with either the transmitter or the receiver. A communication system involving a transmitting modulator and a receiving demodulator transmits communication through light either as phase-modulated light or as amplitude-modulated light.

20 Claims, 6 Drawing Figures

METHOD AND APPARATUS FOR CONVERTING PHASE-MODULATED LIGHT TO AMPLITUDE-MODULATED LIGHT AND COMMUNICATION METHOD AND APPARATUS EMPLOYING THE SAME

CROSS REFERENCE TO RELATED APPLICATION

This application is a-continuation-in-part of my co-pending application Ser. No. 235,006 filed Feb. 17, 1981, now U.S. Pat. No. 4,436,376, which is a continuation-in-part of Ser. No. 121,071, filed Feb. 13, 1980, now U.S. Pat. No. 4,385,806, which is a continuation-in-part of Ser. No. 913,618, filed June 8, 1978, abandoned.

TECHNICAL FIELD

This invention relates to phase modulating polarized light by transmitting the polarized light through at least one liquid crystal cell containing a thin layer of nematic liquid crystal composition having positive dielectric anisotropy, and thereafter converting the phase-modulated light to amplitude-modulated light by means of a linear polarizer.

BACKGROUND ART

Liquid crystal cells containing a layer of nematic liwuid crystal composition between a pair of parallel transparent plates are employed in a variety of optical installations. Such devices are used principally in digital display devices.

In my copending U.S. application Ser. No. 121,071, filed Feb. 17, 1980, now U.S. Pat. No. 4,385,806, an improved liquid crystal cell is described wherein a conductive transparent film is provided on each side of the transparent flat plates which confine the liquid crystal composition. An electrical bias voltage, AC or DC, is applied to the two thin films to permit the liquid crystal composition to respond rapidly to additional electrical voltage applied across the two conductive coatings.

It is also known that thin layers of liquid crystal composition will bring about a phase shift in a beam of polarized light which is transmitted through the liquid crystal composition. Heretofore, the devices have been employed as light shutters which block the polarized light in the regions where an electrical field is established across the liquid crystal composition. Typical turn-off times of 250–300 milliseconds are common with existing liquid crystal light shutters which employ nematic liquid crystals. Such response time is much too large to permit the use of such devices in high speed communication.

In my copending U.S. patent application Ser. No. 235,006 filed Feb. 17, 1982, now U.S. Pat. No. 4,436,376, I have provided a communications system wherein a light beam is polarized and phase-modulated for transmission to a receiving station which includes a demodulator. The transmitted light is a phase-modulated light which requires a phase splitter and a demodulator at the receiving station to convert the phase-modulated light to intelligible form. A receiving station for a phase-modulated light requires complex detection facilities.

There exists a need for simple, inexpensive, lightweight detection facilities for the phase-modulated light transmissions which have been described in my copending application Ser. No. 235,006 aforesaid.

DISCLOSURE OF THE INVENTION

According to the present invention, phase-modulated light is generated from a light source which is initially polarized in a single plane through a linear polarizer and thereafter passes through a liquid crystal cell to which a modulated electrical carrier wave signal is applied as an electrical potential in the manner described in my copending application Ser. No. 235,006. The resulting light has a phase modulation, i.e., the quadrature components are out of phase with each other by an amount corresponding to the modulated electrical carrier wave signal. This phase-modulated light is passed through a linear polarizer which converts the phase-modulated light to amplitude-modulated light whose amplitude corresponds to the modulation of the original modulated electrical carrier wave signal. The amplitude-modulated light can be detected by a simple light detector such as a photocell whose electrical output can be demodulated and converted to intelligible information.

The linear polarizer which converts the phase-modulated light to amplitude-modulated light can be provided adjacent to the transmitting modulator station whereby the light transmitted to the demodulating receiver station will be amplitude-modulated light. Alternatively the linear polarizer may be provided in the demodulating receiving station whereby the transmitted light will be the phase-modulated light.

A principal object of the invention is to convert phase-modulated light to amplitude-modulated light by delivering the phase-modulated light through a linear polarizer.

A further object of the invention is to provide a communications system involving a source of phase-modulated light, a linear polarizer for converting the phase-modulated light to amplitude-modulated light and a light detector to convert the amplitude-modulated light to an electrical signal which can be further transmitted or demodulated or both.

According to the present invention, liquid crystal cells as described in the aforesaid U.S. patent application Ser. No. 121,071 can achieve remarkably rapid response times. Switching speeds of 10 microseconds have been achieved. Such high speed switching permits the application of oscillatory electrical signals of the order of 10 hertz to 500 kilohertz to be applied effectively to such liquid crystal cells. In accordance with this invention, an oscillatory carrier wave signal, for example, a 30 kilocycle signal, is modulated with a lower frequency communication signal, for example, an audio frequency signal or a series of signal pulses. The resulting modulated carrier wave is applied across the conductive surfaces of the electrically biased liquid crystal cell. A beam of polarized light, transmitted through such liquid crystal cell, will experience a phase shift in accordance with the applied modulated carrier wave. The resulting transmitted light beam has an identifiable phase shift which can be detected at a detection location which is remote from the light source. The detection station has facilities for separating the transmitted light beam into its quadrature components. Each of the quadrature components activates an appropriate photo responsive transducer to generate an electrical analog signal corresponding to the observed phase of each quadrature component of the light beam. The analog electrical signals are compared and a differential signal is demodulated to reproduce at the receiving location an electrical signal corresponding to the original input audio signal or chain of pulse signals introduced at the transmitting location.

The liquid crystal cell in this invention consists of a pair of transparent flat plates which are coated with an electrically conductive transparent coating and some parallel surface alignment treatment such as a polyvinyl alcohol coating which has been rubbed uniaxially. The parallel alignment of both transparent plates is parallel in this surface mode modulation invention.

MODES FOR CARRYING OUT THE INVENTION

In accordance with the present invention, a beam of polarized light can be phase modulated in a predictable and reproduceable fashion and thereafter can be amplitude-modulated. It is essential that the source of light be polarized initially and that the polarized light be transmitted through at least one liquid crystal cell having a thin layer of a nematic crystal composition having positive dielectric anisotropy. The liquid crystal layer is confined between parallel transparent plates, such as glass plates, which are coated with a transparent electrically conductive coating such as tin oxide or indium oxide and which are aligned by any appropriate alignment techniques such as uniaxial rubbing of a polyvinyl alcohol coating or by means of uniaxial drying techniques for other coatings. In accordance with the teachings of the aforesaid copending U.S. patent application Ser. No. 121,071, an electrical signal is applied as a bias to the two transparent electrically conductive coatings in order to align the preponderance of the liquid crystal layer except for the liquid crystal molecules immediately adjacent to the electrical conductive coatings. Thereafter the magnitude of an applied electrical signal across the two electrical conductive coatings will determine the amount by which a polarized light beam will have its phase shifted in traversing the liquid crystal cell.

Figure 1:
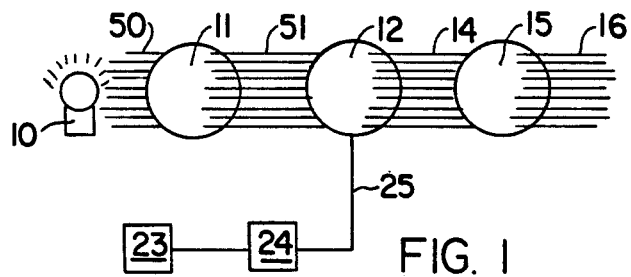
FIG. 1 is a schematic illustration of a transmitter modulator station for generating amplitude-modulated light.

Referring to the drawings, FIG. 1 shows a light source 10 and a linear polarizer 11 in line with an electrically biased, liquid crystal cell 12. A light beam 50 from source 10 is delivered from polarizer 11 as a polarized beam 51 to the electrically biased, liquid crystal cell 12. The electrically biased, liquid crystal cell 12 develops a phase shift in the polarized light beam 51 which is transmitted as the light beam 14. The light beam 14 is phase-modulated in accordance with the amount of phase shift introduced into the light by the electrically biased, liquid crystal cell 12. The phase-modulated light beam 14 is delivered through a linear polarizer 15 which converts the phase-modulated light beam 14 to a corresponding amplitude-modulated light beam 16.

The amount of phase shift introduced into the light beam 14 by the electrically biased, liquid crystal cell 12 may be related to an input oscillatory signal from a source 23 which is modulated in a modulator 24 to produce a modulated carrier wave signal which is applied through conductor 25 across the liquid crystal film of the electrically biased, liquid crystal cell 12.

The light beam 16 has an amplitude which corresponds to the input oscillatory signal from the source 23. The light beam 16 is delivered at a receiving station in FIG. 2 to a light detector 17 such as a photosensitive detector which develops an electrical signal for delivery through a conductor 18 to a demodulator 19 which develops an electrical signal 20 corresponding to the input oscillatory signal 23.

Figure 2:
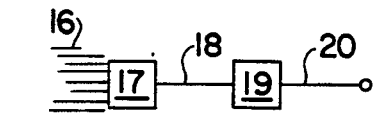
FIG. 2 is a schematic illustration of a receiver demodulator station coordinated with the transmitter station of FIG. 1.

In the embodiment shown in FIGS. 1 and 2, the light beam 16 which is transmitted from the transmitter station of FIG. 1 to the receiver station of FIG. 2 is an amplitude-modulated light beam. This light beam 16 can be interrupted easily by any person who can observe the light beam 16. The light source 10 may be an ordinary incandescent lamp bulb, an infrared light source, an ultra-violet light source, a laser light source, a monochromatic light source or any other source of light. The light source 10 can be particularly selected to increase the security of the transmission system.

Figure 3:
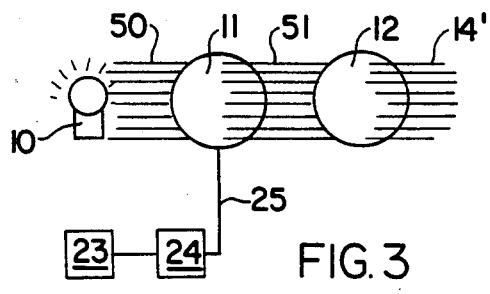
FIG. 3 is a schematic illustration of a transmitter modulator station for generating phase-modulated light.
Figure 4:
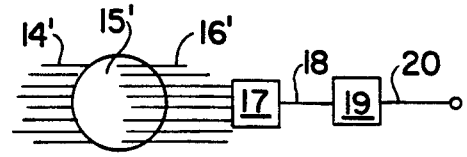
FIG. 4 is a schematic illustration of a receiver demodulator station for converting phase-modulated light to amplitude-modulated light, coordinated with the transmitter station of FIG. 3.

An alternative installation is illustrated in FIGS. 3 and 4 wherein a light source 10 delivers a light beam 50 to a linear polarizer 11 which generates a polarized beam of light 51 for delivery to an electrically biased, liquid crystal cell 12 which modulates the light beam 51 in accordance with the input oscillatory signal from source 23 to produce a phase-modulated light beam 14'. In the embodiment of FIGS. 3 and 4, the transmitted light beam 14' is phase-modulated light which is received at the receiving station of FIG. 4 and delivered through a linear polarizer 15' to produce amplitude-modulated light 16' which is directed against a light detector 17 operating in the manner of the light detector 17 of FIG. 2.

In the embodiment of FIGS. 3 and 4, the transmitted light 14' is phase-modulated light which can be detected by an appropriate phase demodulator as descrebed in my copending application Ser. No. 235,006 aforesaid or can be detected with the amplitude-modulation conversion detector of FIG. 4.

The embodiment of FIGS. 3 and 4 provides substantial security to the transmitted light 14' and yet avoids the need for complex demodulating facilities at the receiving station of FIG. 4. The phase-modulation light transmission as shown in FIGS. 3 and 4 provides a better signal-to-noise ratio and less distortion in the communication system.

Figure 5:
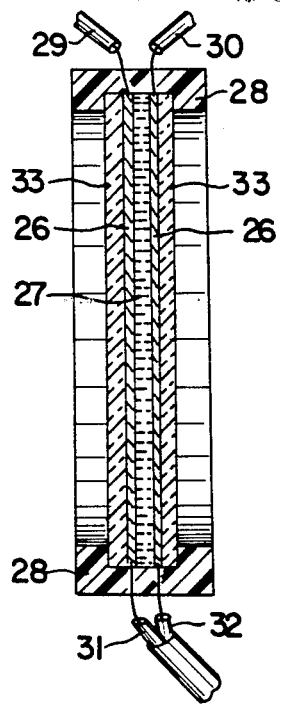
FIG. 5 is a cross-section illustration taken through a light modulating liquid crystal cell unit.

A typical electrically biased, liquid crystal cell for the present purposes is illustrated in FIG. 5 wherein a pair of transparent plates 33 is spaced apart. The transparent plates 33 preferably are optically clear glass although other glass may be employed as well as appropriate transparent plastic substances. Each of the transparent plates 33 has a transparent electrically conductive coating 26 such as tin oxide or indium oxide. A thin layer 27 of nematic liquid crystal composition having positive dielectric anisotropy is provided between the two layers 26. The nematic liquid crystal 27 is preferably from about 6 to 60 microns in thickness. An appropriate perimeter seal such as a collar 28 is provided to confine the liquid crystal layer 27 and to retain the plates 33 in fixed relationship. Two electrical conductors 29, 30 are connected, one to each of the electrically conductive coatings 26 for applying electrical signals across the nematic liquid crystal layer 27.

In the assembly shown in FIGS. 1 and 3, two individual crystal cells of the type shown in FIG. 5 may be employed in series.

Liquid crystal compositions in general are well known. The liquid crystal cell should not have excessive absorption for the light which is being transmitted. For example, where infrared light is employed as a light source 10, the selection of the liquid crystal composition should take this factor into consideration and avoid compositions which have an absorption spectrum which includes infrared wave lengths.

By way of example, the nematic liquid crystals may include phenyl-cyclohexanes, cyano-phenyl-alkyl-benzoates and dialkyl benzoates. No problems have been encountered with the use of Shiff bases as an ingredient of the liquid crystal composition. The liquid crystal composition may be a pure single liquid crystal or may be mixtures of different liquid crystal compositions.

What is important in the present invention is the application of an electrical bias between the conductors 29, 30 which will have the effect of biasing the preponderance of the liquid crystal ingredients in the layer 27 so that the application of incremental electrical signals across the conducting layers 26 will achieve a rapid on-off cycle for the cell. The principle of applying an electrical bias is fully disclosed in copending U.S. patent application Ser. No. 121,071 aforesaid. The electrical bias which is applied to the conductors 29, 30 may be a DC bias or an AC bias. If an AC signal is applied as the bias for the liquid crystal cell, its frequency should be dissimilar to the frequency of any carrier signals which are employed as a modulating signal. By providing an electrical bias, the liquid crystal cell may be rapidly and reliably regulated whereby the phase shift experienced by a polarized light beam traversing through the liquid crystal cell will be dependent upon the instantaneous amplitude of the applied modulating signal. An appropriate modulating signal may be applied to the electrically conductive layers 26 through electrical conductors 31, 32 (FIG. 5) or may be added to the bias conductors 29, 30. By providing a liquid crystal cell having a response cycle time less than 30 milliseconds, the liquid crystal cell can react to oscillatory electrical impulses having frequencies of 300 kilohertz.

INDUSTRIAL APPLICABILITY

Referring to FIG. 1, a light source 10 having a wave length from about 4 microns to about 240 millimicrons delivers a beam of light 50 through a linear polarizer 11 to develop a polarized light beam 51. The polarized light beam 51 is delivered through the transparent liquid crystal cell 12 to generate a phase shifted light beam 14. The polarized light beam 51 is a light beam having waves which vibrate primarily in parallel planes. As is well known, the light waves which appear to be in the polarization planes are resultant waves which can be considered to have a fast axis component and a slow axis component at right angles to each other, also known as quadrature components. The polarized light beam 51, when passing through the liquid crystal cell 12, will experience a retardation of the slow axis component by an amount which is dependent upon the intensity of the electrical charge on the liquid crystal cell 12. Thus the light beam 14 can be distinguished from the polarized light beam 51 in that the slow axis components of the beam have been retarded by a measurable amount which is less than a quarter wave length of the light in the beam 50. The light beam 14 may be employed as a modulated light beam for delivering communications if desired. However, it is preferred to deliver the phase modulated light beam 14 through a second liquid crystal cell (not shown) to increase the linearity of the phase modulated beam. The oscillatory electrical signal applied to said second liquid crystal cell is the inverted oscillatory electrical signal which appears at conductor 25. Two such sequential liquid crystal cells function in a manner analogous to that of a push-pull amplifier, and thus greatly reduce harmonic distortions.

The present light conversion invention functions best with monochromatic light wherein significant phase shifts can be achieved. When operating with white light, the phase shift should be relatively small, that is, within a total range of 180 degrees. Where monochromatic light is employed, the phase shift may be substantial, i.e., plus or minus 90 degrees from any amount of phase shift. For example, the initial light may be shifted through 360 degrees and the modulation may occur plus or minus 90 degrees from the 360 degree phase shift.

Figure 6:
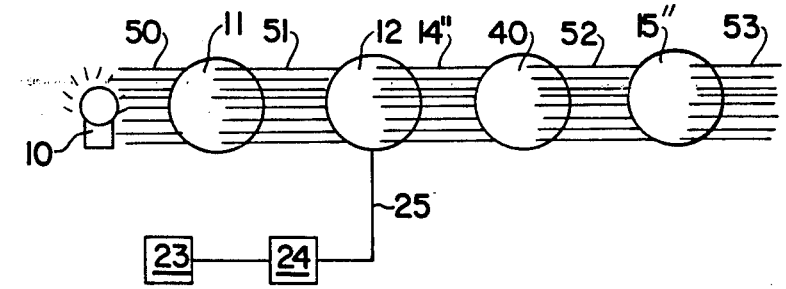
FIG. 6 is a schematic illustration of a further improvement in the transmitter modulator station of FIG. 1.

The linear polarizer 15 (FIG. 1) and 15' (FIG. 4) which is employed to convert the phase-modulated light should have its polarization plane parallel to the polarization plane of the polarizer 11 which develops the polarized light 50. The need for aligning the linear polarizers 15, 11 and 15', 11 can be averted as shown in FIG. 6. A one-quarter wave retardation plate 40 is introduced into the optical system between the electrically biased, liquid crystal cell 12 and a modulation converting linear polarizer 15''. For example in FIG. 6, the quarter wave retardation plate 40 would be inserted in a beam 14'' whereby the orientation of the linear polarizer 15'' with respect to the linear polarizer 11 becomes unimportant.

The quarter wave retardation plate 40 is oriented at 45 degrees to the plane of the linear polarizer 11. The quarter wave retardation plate 40 may be a component of the transmitter station in which embodiment the light beam 52' will be transmitted as phase-modulated light; the linear polarizer 15'' will be part of the receiving station in this embodiment. In an alternative embodiment, the quarter wave retardation plate 40 may be combined in a receiver station with the linear polarizer 15''; in this embodiment the light beam 14'' will be transmitted as phase-modulated light. In both embodiments the orientation of the linear polarizer 15'' with respect to the linear polarizer 11 is unimportant because of the compensation supplied by the quarter wave retardation plate 40 which is interposed in the optical path between the electrically biased, liquid crystal cell 12 and the linear polarizer 15''.

In a still further embodiment, the quarter wave plate 40 and the linear polarizer 15'' can be included in the transmitter station; in this embodiment the light beam 53 will be transmitted as amplitude-modulated light.

I claim:

1. A light transmitter comprising
at least one liquid crystal cell comprising two parallel transparent plates; a transparent electrical conductive layer applied to the confronting surfaces of the said two plates; each said conductive layer having parallel surface alignment, the said alignment of the two adjoining surfaces being parallel; a continuous layer of nematic liquid crystal having positive dielectric anisotropy between the two electrical conducting coatings;

means for applying a fixed electrical bias to the two said electrical conducting coatings;

means for applying an amplitude modulated oscillatory electrical signal across the said continuous layer; a source of polarized light directed through the said two transparent plates;

whereby the light which passes through the said two transparent plates is a phase-shifted beam which is distinguishable from the light from the said source in a manner which corresponds to the said oscillatory electrical signal; and a linear polarizer for converting said phase-shifted beam to a light beam whose amplitude corresponds to said oscillatory electrical signal.

2. The light transmitter of claim 1
including two said liquid crystal cells in series with their slow axes oriented at 90 degrees to each other.

3. The light transmitter of claim 2
wherein the said oscillatory electrical signal is applied to one of said liquid crystal cells and the inverted oscillatory electrical signal is applied to the other of one of said liquid crystal cells.

4. The light transmitter of claim 1
wherein the said oscillatory electrical signal has a frequency of 10 hertz to 500 kilohertz.

5. The light transmitter of claim 1
wherein the said linear polarizer is aligned parallel to or at right angles to the polarization plane of the said source of polarized light.

6. The light transmitter of claim 1
including a quarter-wave retardation plate interposed between the said liquid crystal cell and the said linear polarizer.

7. The light transmitter of claim 6
wherein the axes of the said quarter wave retardation plate are oriented at 45 degrees to the polarization plane of the said source of polarized light.

8. A communication system including
a transmitter station comprising the light modulator of claim 1 for generating and delivering amplitude-modulated light corresponding to a first oscillatory electrical signal;

a receiver station comprising:

a light detector responsive to said amplitude-modulator light for developing an electrical signal corresponding to the said amplitude-modulated light;

a demodulator for generating a second oscillatory electrical signal from the said electrical signal developed by said light detector corresponding to the said first oscillatory electrical signal.

9. A communications system comprising:
a transmitter station including light modulator means for generating phase-modulated light corresponding to a first oscillatory electrical signal;

said light modulator means comprising at least one liquid crystal cell comprising two parallel transparent plates; a transparent electrical conductive layer applied to the confronting surfaces of the said two plates; each said conductive layer having parallel surface alignment, the said alignment of the two adjoining surfaces being parallel; a continuous layer of nematic liquid crystal having positive dielectric anisotropy between the two electrical conducting coatings; means for applying an electrical bias to the two said electrical conducting coatings; means for applying an electrical signal of varying amplitude having a frequency greater than 10 hertz across the said continuous layer; a source of polarized light directed through the said two transparent plates; whereby the light which passes through the said two transparent plates is a phase modulated light which is distinguishable from the light from said source in a manner which corresponds to said electrical signal of varying amplitude;

a receiver station for demodulating the said phase-modulated light comprising:

a linear polarizer for converting the said phase-modulated light to amplitude-modulated light;

a light detector for generating an electrical signal corresponding to the said amplitude-modulated light; a demodulator for demodulating the said electrical signal from the said light detector to generate a second electrical signal of varying amplitude corresponding to the said first electrical signal of varying amplitude.

10. A method for generating amplitude-modulated light corresponding to a first oscillatory electrical signal comprising:

polarizing light from a light source in a first linear polarizer to generate a first polarized light beam;

passing said polarized light beam through an electrically biased, liquid crystal cell to develop a phase-modulated light beam;

applying an electrical bias to the said electrically biased, liquid crystal cell; applying said first oscillatory electrical signal modulated with a carrier wave to said first electrically biased, liquid crystal cell whereby the said phase-modulated light corresponds to the said first oscillatory electrical signal;

passing the said phase-modulated light through a second linear polarizer to convert the said phase-modulated light to amplitude-modulated light.

11. The method of delivering a first electrical signal of varying amplitude from a transmitter station to a receiving station which comprises generating in said transmitter station a phase-modulated light beam corresponding to said first electrical signal of varying amplitude by the following means;

directing a beam of linearly polarized light through a liquid crystal cell formed from two parallel transparent plates and having a transparent electric conductive layer applied to the confronting surfaces of the said two plates wherein each said conductive layer has parallel surface alignment and wherein the alignment of the two adjoining surfaces is parallel and having a continuous layer of nematic liquid crystal with positive dielectric anisotropy between the two said electrical conductor coatings; applying an electrical bias to the two said electrical conducting coatings; applying said electrical signal of varying amplitude having a frequency greater than 10 hertz to the said electrical conducting coatings; whereby the said phase modulated light beam is distinguishable from the said polarized light source in manner which corresponds to the said electrical signal of varying amplitude; delivering said phase-modulated light to said receiving station including a light detector for generating an electrical signal corresponding to an amplitude-modulated light; a demodulator for demodulating the said electrical signal from the said light detector to generate a second electrical signal of varying amplitude corresponding to said first electrical signal of varying amplitude;

interposing a linear polarizer in the optical path of said phase-modulated light beam between said transmitter station and said receiving station.

12. The method of claim 11 wherein the said linear polarizer is adjacent to the said transmitter station and the light transmission from the said transmitter station to the said receiver station is an amplitude-modulated light.

13. The combination system of claim 11 wherein the said linear polarizer is adjacent to the said receiving station and the light transmitted from the said transmitter station to the receiving station is phase-modulated light.

14. A light modulator comprising a film of nematic liquid crystals having positive anisotropy, means for rapidly altering the polarization property of said film by altering alignment of the liquid crystal structure solely at a surface thereof without rapidly altering the alignment of the subsurface liquid crystal structure, whereby the light polarization property of the said film varies in accordance with the alignment of the surface liquid crystal structure.

15. The light modulator of claim 14 wherein said means includes first means for applying a bias across the said film and second means for applying an electrical signal of varying amplitude across the said film.

16. The light modulator of claim 15 wherein the said bias establishes the angular orientation of the subsurface liquid crystal structure and wherein said electrical signal of varying amplitude establishes the angular orientation of the said liquid crystal structure at the said surface.

17. The light modulator of claim 15 wherein the said electrical signal of varying amplitude effects rapid switching of the polarization property of the said film.

18. The method of modulating light at high speeds comprising:

passing said light through a film of nematic liquid crystals having positive anisotropy, applying an electrical signal of varying amplitude to the surfaces of said film to alter the alignment of the said liquid crystals of at least one said surface, thereby altering the polarization property of said film; and delivering from said film the said light which is modulated in accordance with the said electrical signal.

19. An apparatus for modulating light comprising means for polarizing incident light;

at least one liquid crystal cell comprising two parallel transparent plates; a transparent electrical conductive layer applied to the confronting surfaces of the said two plates; each said conductive layer having parallel surface alignment, the said alignment of the two adjoining surfaces being parallel; a continuous layer of nematic liquid crystal having positive dielectric anisotropy between the two electrical conductive coatings;

means for applying an electrical bias to the two said electrical conductive coatings;

means for applying an electrical signal of varying amplitude to the said electrical conductive coatings;

whereby the said nematic liquid crystal is affected by said electrical signal solely at the interfacing surface with at least one of said electrical conducting coatings, thereby permitting rapid response of the said nematic liquid crystal layer to the applied electrical signal having frequencies of 10 hertz to 500 kilohertz; a source of polarized light directed through the said two transparent plates;

whereby the light which passes through the said two transparent plates is a phase shifted beam which is distinguishable from the said source in a manner which corresponds to the said electrical signal.

20. A method for generating intensity modulated light corresponding to a first electrical signal of varying amplitude comprising:

passing polarized light through a liquid crystal film containing nematic liquid crystals having positive anisotropy;

orienting the liquid crystal structure perpendicular to said film;

applying said first electrical signal of varying amplitude to a surface of said liquid crystal film in its oriented condition, whereby light leaving said liquid crystal film corresponds in phase to the said first electrical signal; polarizing the leaving light to convert the output light to intensity modulated light.

* * * * *

UNITED STATES PATENT AND TRADEMARK OFFICE
CERTIFICATE OF CORRECTION

PATENT NO. : B1 4,540,243
DATED : Sep. 18, 1990
INVENTOR(S) : James L. Fergason

It is certified that error appears in the above-identified patent and that said Letters Patent is hereby corrected as shown below:

In the Reexamination Certificate, items [76] and [19], the inventor should be identified as --James L. Fergason-- or --Fergason--.

In the Reexamination Certificate at Column 2, line 7, the claim reference numeral "26" should read --25--; in line 31, a comma --,-- should be inserted after the claim reference numeral "31"; and in line 52, the claim reference numeral "25" should read --35--.

Signed and Sealed this

Nineteenth Day of March, 1991

Attest:

HARRY F. MANBECK, JR.

*Attesting Officer*         *Commissioner of Patents and Trademarks*

REEXAMINATION CERTIFICATE (1355th)
United States Patent [19]
Ferguson

[11] B1 4,540,243
[45] Certificate Issued Sep. 18, 1990

[54] METHOD AND APPARATUS FOR CONVERTING PHASE-MODULATED LIGHT TO AMPLITUDE-MODULATED LIGHT AND COMMUNICATION METHOD AND APPARATUS EMPLOYING THE SAME

[76] Inventor: James L. Ferguson, 5806 Horning Rd., Kent, Ohio 44240

Reexamination Request:
No. 90/001,778, Jun. 2, 1989

Reexamination Certificate for:
Patent No.: 4,540,243
Issued: Sep. 10, 1985
Appl. No.: 409,526
Filed: Aug. 19, 1982

[51] Int. Cl.⁵ .............................................. G02F 1/13
[52] U.S. Cl. .................................. 350/337; 350/332; 350/347 E; 455/605; 455/611; 455/616; 455/617
[58] Field of Search ..................... 350/332, 337, 347 E; 455/605, 611, 616, 617

[56] References Cited
U.S. PATENT DOCUMENTS 3,495,189 2/1970 Le Craw ................................ 332/51
3,785,721 1/1974 Harsch ................................ 350/347 R
4,131,791 12/1978 Lego, Jr. ............................... 250/199

OTHER PUBLICATIONS

K. Uehara, H. Mada, and S. Kobayashi, "Reduction of Electrooptical Response Times of a Field-Effect Liquid-Crystal Device: Application to Dynamic-Drive Real-Time Matrix Display," published in *IEEE Transactions on Electron Device*, Ed-22, No. 9, Sep. 1975, pp. 804–805.
James L. Fergason, "Performance of a Matrix Display Using Surface Mode," *Proceedings of the 1980 Biennial Display Research Conference*, p. 177.
S. Sato and M. Wada, "Reduction of Response and Recovery Times of Nematic Cells with Electrically Controlled Birefringence," *Electronics and Communications in Japan*, vol. 60-C, No. 11, 1977, p. 129.
T. Shimomura, H. Mada, and S. Kobayashi, "Angular Dependence of Voltage Controlled Color Formation with a Twisted Nematic Liquid Crystal Cell," *Japan. J. Appl. Phys.*, vol. 15, No. 9, 1977, pp. 1815–1816.
Fang-Shang Chen, "Modulators for Optical Communication," *Proceedings of the IEEE*, vol. 58, No. 10, Oct. 1970, pp. 1446–1457.
E. Norman Lurch, *Fundamentals of Electronics*, (2d ed. 1971), pp. 535–537.
Terry J. Scheffer and Hans C. Grüler, "Electro-Optics of Liquid Crystals", Ch. 22 in *Molecular Electro-Optics Part 2*, pp. 790–811, (C. O'Konski ed. 1978).

*Primary Examiner*—S. D. Miller

[57] ABSTRACT

A light modulator for generating a beam of amplitude-modulated light including a source of polarized light, at least one and preferably two liquid crystal cells having a thin layer of nematic liquid crystals of positive dielectric anisotropy through which the polarized light is directed to produce a beam of light having a phase shift corresponding to a modulating electrical signal which is applied to each of the liquid crystal cells. The liquid crystal cells in addition have a continuing electrical bias applied across the layers in order to achieve the rapid response times necessary to achieve phase modulation of the polarized light. The resulting phase-modulated light is converted in a linear polarizer to amplitude-modulated light corresponding to the modulating electrical signal. The amplitude-modulated light is detected in a suitable light detector which generates an electrical signal corresponding to the modulating electrical signal. The linear polarizer may be oriented with either the transmitter or the receiver. A communication system involving a transmitting modulator and a receiving demodulator transmits communication through light either as phase-modulated or as amplitude modulated light.

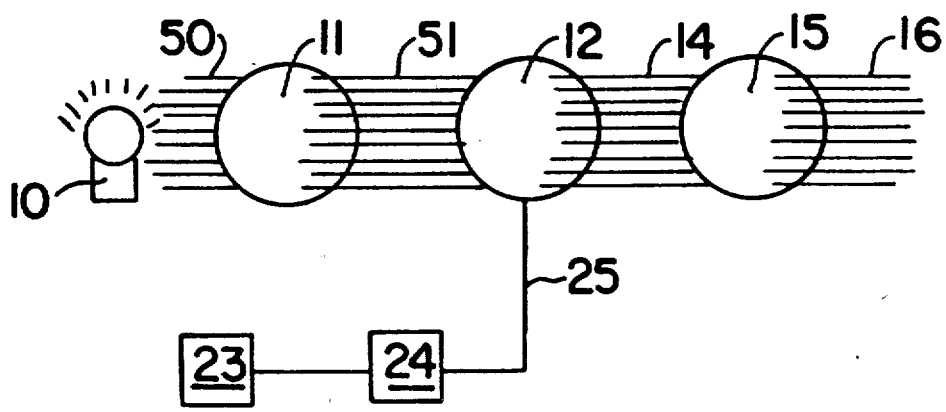

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-13 and 15-20 is confirmed.

Claim 14 having been finally determined to be unpatentable, is cancelled.

New claims 21-36 are added and determined to be patentable.

*21. A light modulator for modulating multicolor light comprising a film of nematic liquid crystals having positive dielectric anisotropy,*
  *means for rapidly altering the polarization property of said film by altering alignment of the liquid crystal structure solely at a surface thereof without rapidly altering the alignment of the subsurface liquid crystal structure to effect a phase shift in light transmitted therethrough within a range of 180 degrees,*
  *whereby the light polarization property of the said film varies in accordance with the alignment of the surface liquid crystal structure.*

*22. The light modulator of claim 21, and further comprising means for supplying multicolor light for transmission through said film.*

*23. The light modulator of claim 21, and further comprising an optical retarder in optical series with said film of liquid crystals.*

*24. The light modulator of claim 23, said optical retarder comprising a quarter wave plate.*

*25. A light modulator for modulating white light comprising a film of nematic liquid crystals having positive dielectric anisotropy,*
  *means for rapidly altering the polarization property of said film by altering alignment of the liquid crystal structure solely at a surface thereof without rapidly altering the alignment of the subsurface liquid crystal structure to effect a phase shift in light transmitted therethrough within a range of 180 degrees,*
  *whereby the light polarization property of the said film varies in accordance with the alignment of the surface liquid crystal structure.*

*26. The light modulator of claim 25, and further comprising means for supplying white light for transmission through said film.*

*27. The light modulator of claim 26, and further comprising an optical retarder in optical series with said film of liquid crystals.*

*28. The light modulator of claim 27, said optical retarder comprising a quarter wave plate.*

*29. A light modulator for modulating multicolor light comprising a film of nematic liquid crystals having positive dielectric anisotropy,*
  *means for rapidly altering the polarization property of said film by altering alignment of the liquid crystal structure solely at a surface thereof without rapidly altering the alignment of the subsurface liquid crystal structure to effect a phase shift in light transmitted therethrough without substantial color dispersion or basically within a range of 180 degrees,*
  *whereby the light polarization property of the said film varies in accordance with the alignment of the surface liquid crystal structure.*

*30. The light modulator of claim 29, and further comprising means for supplying multicolor light for transmission through said film.*

*31. The light modulator of claim 29, and further comprising an optical retarder in optical series with said film of liquid crystals.*

*32. The light modulator of claim 31 said optical retarder comprising a quarter wave plate.*

*33. A light modulator for modulating white light comprising a film of nematic liquid crystals having positive dielectric anisotropy,*
  *means for rapidly altering the polarization property of said film by altering alignment of the liquid crystal structure solely at a surface thereof without rapidly altering the alignment of the subsurface liquid crystal structure to effect a phase shift in light transmitted therethrough without substantial color dispersion or basically within a range of 180 degrees,*
  *whereby the light polarization property of the said film varies in accordance with the alignment of the surface liquid crystal structure.*

*34. The light modulator of claim 33, and further comprising means for supplying white light for transmission through said film.*

*35. The light modulator of claim 33, and further comprising an optical retarder in optical series with said film of liquid crystals.*

*36. The light modulator of claim 25, said optical retarder comprising a quarter wave plate.*

* * * * *